United States Patent [19]
Nomura et al.

[11] Patent Number: 4,702,007
[45] Date of Patent: Oct. 27, 1987

[54] RECHARGEABLE ELECTRIC CAN OPENER

[75] Inventors: Shigeo Nomura; Syoji Nakanishi, both of Sumoto, Japan

[73] Assignee: Sanyo Electric Co., Ltd., Osaka, Japan

[21] Appl. No.: 896,367

[22] Filed: Aug. 14, 1986

[30] Foreign Application Priority Data

Aug. 19, 1985 [JP] Japan .................. 60-181265
Aug. 20, 1985 [JP] Japan .................. 60-182414

[51] Int. Cl.$^4$ ............................ B23P 17/00
[52] U.S. Cl. .......................... 30/423; 30/419; 320/2; 339/34; 339/58
[58] Field of Search ............ 30/416, 421, 423, 424, 30/425, DIG. 1, 417, 418, 419, 420, 422, 427; 339/34, 58; 320/2

[56] References Cited
U.S. PATENT DOCUMENTS

| | | | |
|---|---|---|---|
| 3,458,794 | 7/1969 | Bohnstedt et al. | 339/34 X |
| 4,050,003 | 9/1977 | Owings et al. | 339/58 X |
| 4,467,263 | 8/1984 | Conforti et al. | 320/2 |
| 4,561,192 | 12/1985 | Yamamoto et al. | 30/419 X |

Primary Examiner—Douglas D. Watts
Attorney, Agent, or Firm—Beveridge, DeGrandi & Weilacher

[57] ABSTRACT

A rechargeable electric can opener including a can-feed wheel disposed on an outer face of a flat casing mounting a motor and a reduction gear mechanism therein, a cutter having a cutting edge capable of turning up-and-down to open a lid of the can in cooperation with the feed wheel, an attached plug to be inserted in an electrical outlet, a step-down transformer, and a rechargeable secondary battery. The can opener is characterized in that the plug is attached on the other face of the casing near a center of gravity which is mainly determined by locations of the motor, reduction gear mechanism, step down transformer and secondary battery.

12 Claims, 20 Drawing Figures

RECHARGEABLE ELECTRIC CAN OPENER

BACKGROUND OF THE INVENTION

The present invention relates to an electric can opener wherein a rechargeable battery is utilized.

Figure 19:
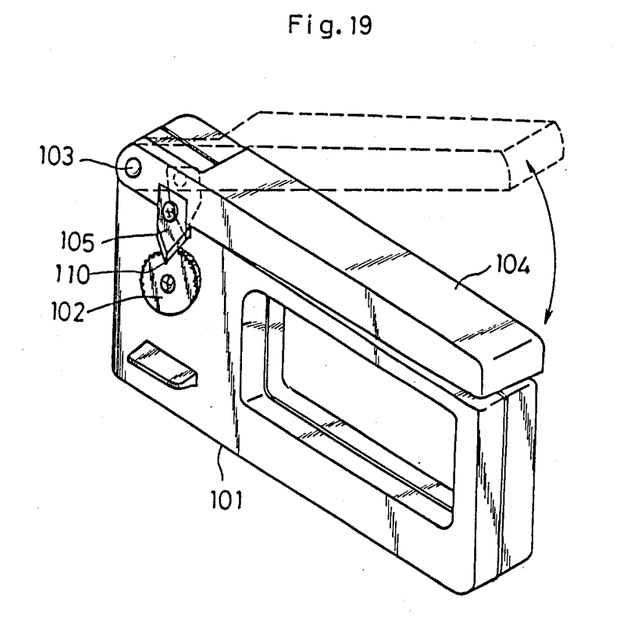
FIG. 19 is a perspective view of the can opener of the prior art.
Figure 20:
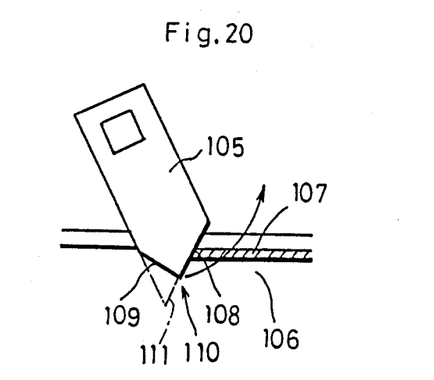
FIG. 20 is a view depicting a cutter-shape of the prior art.

The prior art to which the present invention is directed includes an electric can opener, as illustrated in FIGS. 19 and 20, having a casing 101 of the main body, a moter and a reduction gear mechanism (not illustrated) disposed inside the casing 101, a can-feed wheel 102 connected to an output end of the reduction gear mechanism, a handle-lever 104 disposed in the upper part of the casing 101 turnable around a fulcrum 103, as shown by chain line in FIG. 19, and a cutter 105 fixed to the handle-lever 104 capable of turning up-and-down following the turning movement of the handle-lever 104 to open a lid 107 of the can. At the top part 110 of the cutter 105, there is normally formed a cutting edge 108 and 109 obliquely cut so that the cutter 105 well bites into the lid 107. Further, as a substitute for the above edges 108, 109, a cutting edge 111 obliquely cut along one side of the cutter 105, as illustrated by one-dot chain line in FIG. 19, is also within the skill of the art as disclosed in Japanese Patent Publication No. 42600/1973.

In the can opener mentioned above, the edge of the lid 107 is sandwitched between the cutter 105 and the feed wheel 102, bit by the edge 108 and 109 of the cutter 105, and the can is carried by the feed wheel 102 to open the lid 107.

Most of such electric can opener is used by inserting a plug provided at an end of a cord into an electrical outlet, as seen in Japanese Patent Publication No. 11635/1977. The above type of electric can opener, therefore, cannot be used if an electrical outlet is not installed nearby.

To avoid the drawback mentioned above, a rechargeable electric can opener is commercially available. Such a rechargeable electric can opener is so-called a stand-type one, consisting of a recharger and a main body of the opener, each of which has an individual structure and is separated each other since respective volume is relatively large. The can opener is recharged by connecting the main body of the opener to the recharger, and plugging the recharger via a cord to an electrical outlet. When opening a can, the main body of the opener is removed from the recharger. Thus, the can-opening operation can be carried out at an arbitary place. According to such rechargeable can opener, therefore, the above-mentioned drawback of the opener directly plugged in an electrical outlet can be overcome.

However, the above rechargeable electric can opener has a weakness that a packing volume becomes large and much manufacturing cost is required, since the recharger and the main body of the opener are isolated to each other, and the plug for recharging the recharger is connected to the recharger via a cord. Another weakness is that, when recharging the electric can opener, there are needed two operations; an operation to insert the main body of the can opener to the recharger, and an operation to plug the recharger in the outlet. These two operations are troublesome for a user. Further, recharging will be impossible when the recharger is lost.

An object of the invention is to provide a rechargeable electric can opener which comprises in one small-sized flat casing a main body of the opener and a recharger involving a secondary battery, whereby the secondary battery mounted in the casing can be recharged by inserting an attached plug to an electrical outlet without applying an excessive moment to the plug.

The above and the other objects of the invention will become apparent from the following description taken in conjuction with the accompanying drawings.

DETAILED DESCRIPTION

The invention is described below in detail with reference to the accompanying drawings showing the preferred embodiments of the rechargeable electric can opener of the invention.

General Structure of the Can Opener

FIGS. 1 to 6 illustrate a rechargeable electric can opener of the invention which is composed of a casing K, a feed wheel driving mechanism A to actuate a rotatable feed wheel 1 disposed on a face of the casing K, and a cutter-operating mechanism B to drive a cutter 3 pivotally disposed on the same face above the feed wheel 1. The cutter 3 opens up a lid of a can carried by the feed wheel 1.

Figure 1:
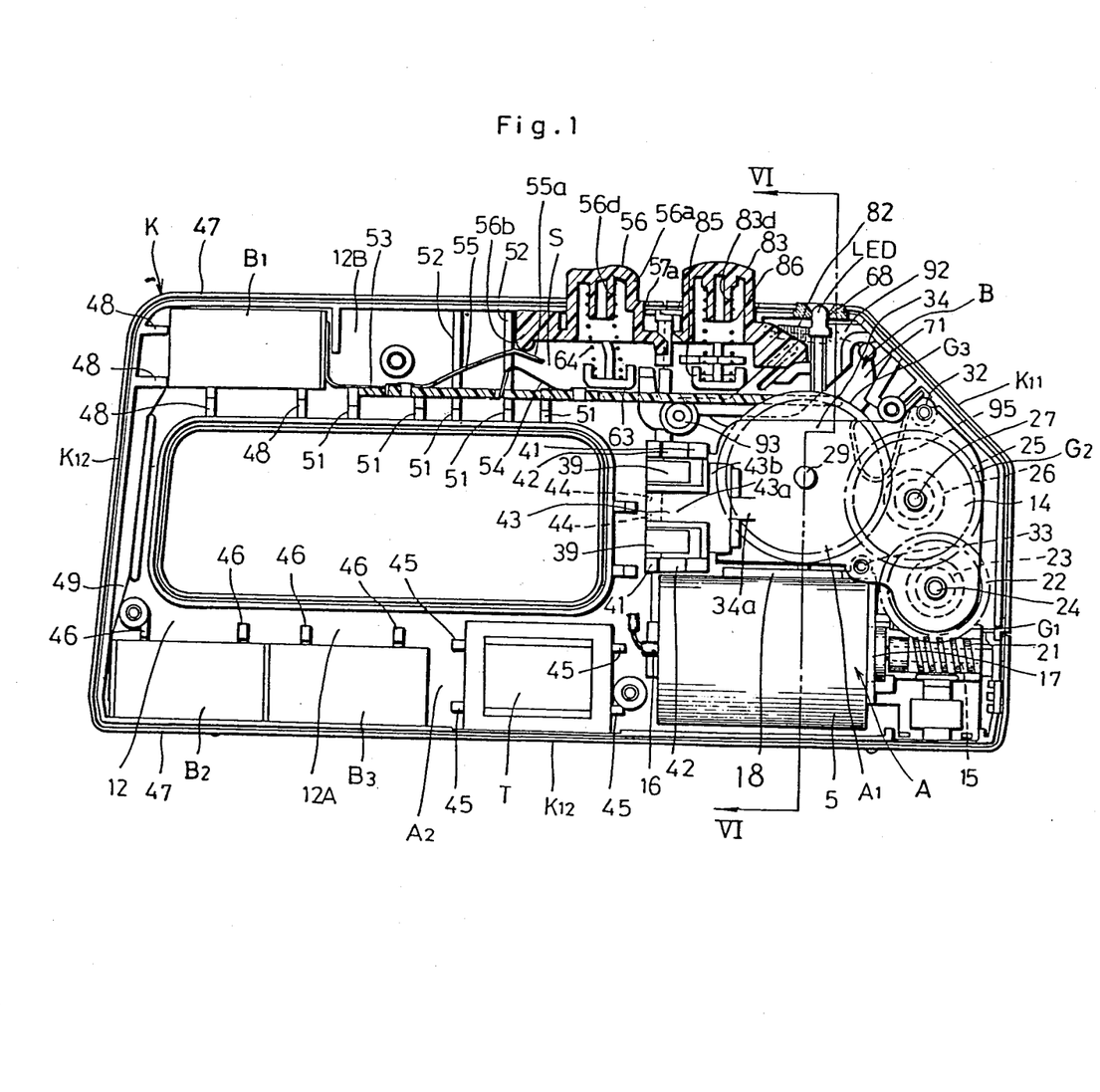
FIG. 1 is a partially sectional view showing a can opener of the invention in which the second piece is removed.

The feed wheel driving mechanism A includes a mechanical component A1 to deceleratingly actuate the feed wheel 1 by a motor 5 and a redution gear mechanism 14, and an electrical component A2 to electrically actuate and control the motor 5.

Casing

Figure 6:
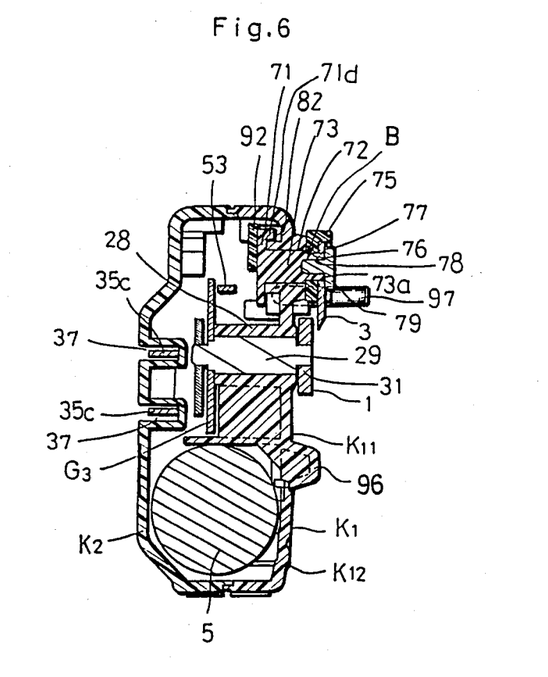
FIG. 6 is a sectional view along VI—VI line of FIG. 1.

A casing K is made of a synthetic resin and is generally flat in the respect that it has a reduced thickness. The casing K is composed of a first piece K1 to which a feed wheel 1 and a cutter means 3 is attached, and a second piece K2 to be fitted to the first piece K1 from the behind thereof (see FIGS. 2 and 3). As shown in FIG. 6, the feed wheel 1 and cutter 3 are located on a first side of the casing K, and an electrical plug with blades 35c is located on a second side of the casing. Both pieces are removably combined with each other by screws 6 to 9 (see FIG. 3). The casing K can also be divided, from a functional viewpoint, into a mechanical section 10 mainly mounted with the above mechanical component A1, and a handle section 12 joined to the mechanical section 10. The handle section 12 includes a rectangular opening 11 through which the handle section 12 can be gripped.

Figure 2:
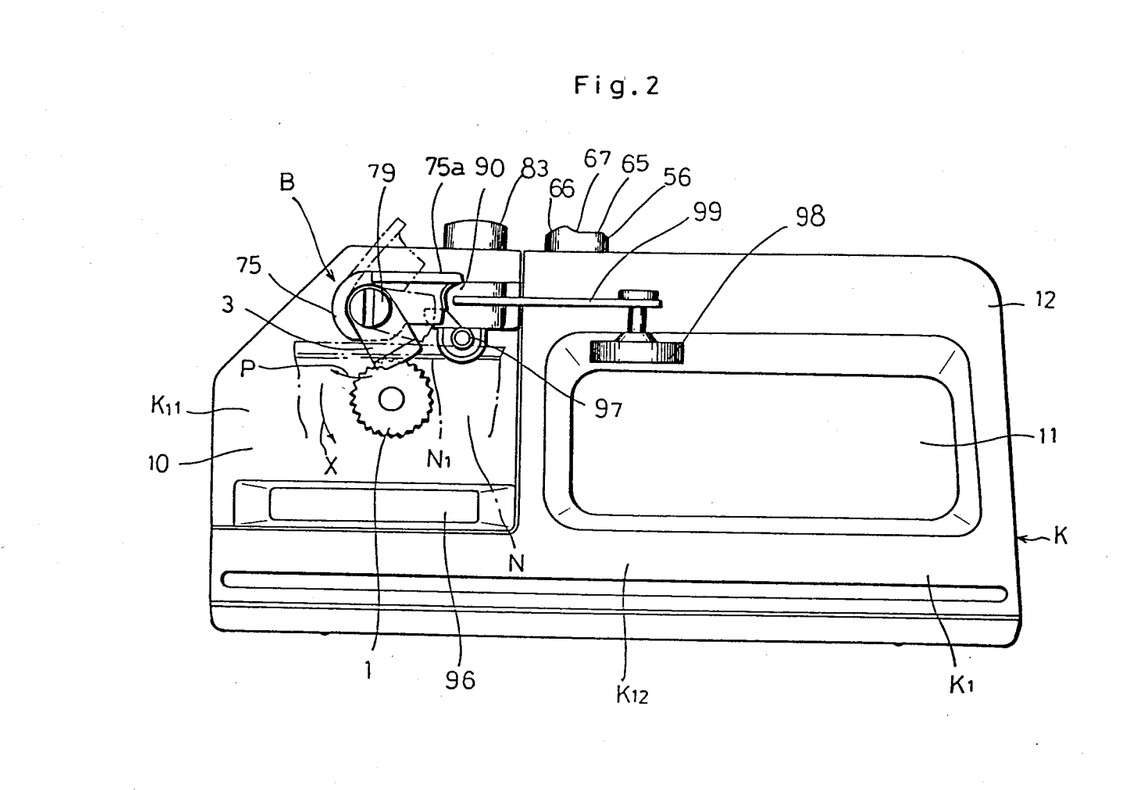
FIG. 2 is a plan view.

The first piece K1 is composed of a front part K11 corresponding to the mechanical section 10, and a rear part K12 corresponding to the handle section 12 (see FIG. 2). Both parts K11 and K12 are secured to each other by screws (not illustrated) with their joint parts overlapped.

The second piece K2 includes a partially rising face 36 corresponding to a thickness of the built-in motor 5.

The coloration of the front part K11 of the first piece is black or near black so that a dirt is not noticeable, while the rear part K12 of the first piece and the second piece K2 is white or near white.

Feed Wheel Driving Mechanism—Mechanical Component

With reference to FIGS. 1 and 6, the feed wheel driving mechanism A is explained hereinafter.

The mechanical component A1 of the feed wheel driving mechanism A is mainly composed of a DC-motor 5 and a reduction gear mechanism 14.

The motor 5 is secured to a stand-up dividing wall integrally formed on the first part K11 by screws (not illustrated) piercing through the wall, and is horizontally laid in a perpendicular direction to a thickness of the mechanical section 10 (i.e., parallel to the paper of FIG. 1).

A shaft 15 of the motor 5 is projecting to the front (right-hand side in FIG. 1) penetrating the dividing wall 17, and an electrical leads 16 are supplied from the rear side (left-hand side in FIG. 1) of the motor 5.

The reduction gear mechanism 14 includes a worm gear 21, a first gear G1, a second gear G2 and a third gear G3. The worm gear G1 is made of metal and is mounted on the shaft 15. The first gear G1 is rotatably mounted on a metal axle 24 projecting on the front part K11 to the inside thereof. The second gear G2 is rotatably mounted on a metal axle 27 projecting on the front part K11 to the inside thereof. The third gear G3 is tightly mounted on the metal axle 29 which is rotatably mounted passing through a cylindrical bearing 28 integrally and projectingly formed on the front part K11.

Each of the metal axles 24, 27 and 29 are supported between an inner face of the front part K11 and a supporting board 34 which is screwed to boss sections 32, 33 of the first piece K1 keeping a predetermined interval from the inner face of the front part K11.

The first gear G1 includes a large-diametral gear 22 of synthetic resin to mesh with a worm gear, and a concentric small-dimetral gear 23 positioned at the front part K11-side on the gear 22. The second gear G2 includes a large-diametral gear 25 of synthetic resin to mesh with the gear 23, and a concentric small-diametral metal gear 26 positioned at the supporting board 34-side on the gear 25. The third gear G3 meshes with the gear 26.

The gear ratio of the above-mentioned reduction gear mechanism 14 is established as 268 : 1, and especially, the gear ratio of the worm gear 21 and the first gear G1 is set to 33: 1, obtaining a large reduction ratio by the small gears.

One end of the metal axle 29, i.e., a part projecting outside from the front part K11, is formed with a male screw to which the feed wheel 1 is screwed so that the feed wheel 1 is easily attached and removed. The male screw is so formed that the direction X of rotation of the metal axle 29 becomes opposite to the direction of screwing the feed wheel 1.

In such a manner, a rotating speed of the motor shaft 15 can be decelerated and transmitted to the feed wheel 1 which is rotatably and projectingly provided on the face of the first piece K1.

Feed Wheel Driving Mechanism—Electrical Component

Figure 7:
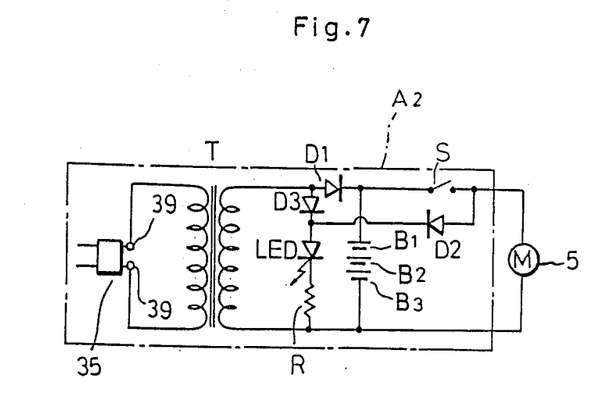
FIG. 7 is an wired diagram of an electrical component.

The electrical component A2 of the feed wheel driving mechanism A includes, as illustrated in FIG. 7, a plug 35 to be inserted in an electrical outlet (not illustrated), a step-down transformer T connected to the electrical connector plug 35, three secondary (rechargeable) batteries B1 to B3 of Ni-Cd to be connected through a rectifying diode D1 to the secondary side of the transformer T, a motor 5 fed from the batteries B1 to B3, an operation control switch S inserted in series to the motor 5, a diode D3 one end of which is connected to the secondary side of the transformer T, a diode D2 one end of which is directly connected to the motor 5, a light emitting diode LED connected to the other ends of both diodes D2 and D3, and a resister R.

The diode D3 connected to the secondary side of the transformer T is to turn on the light emitting diode LED during the batteries B1 to B3 are recharged. The diode D2 directly connected to the motor 5 is to turn on the light emitting diode LED when the motor 5 is actuated.

Figure 3:
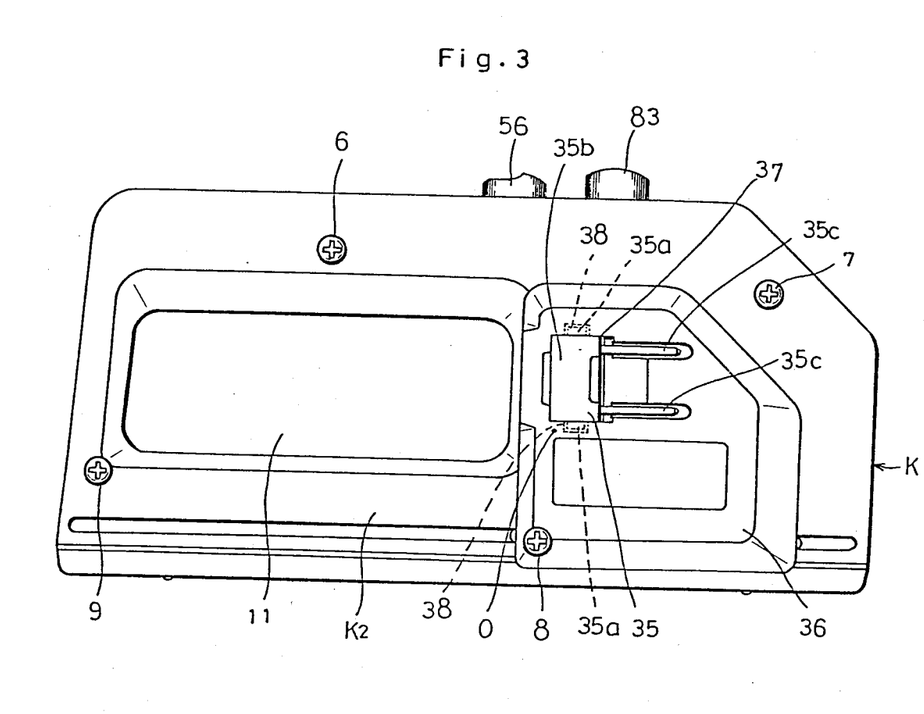
FIG. 3 is a rear view.
Figure 18:
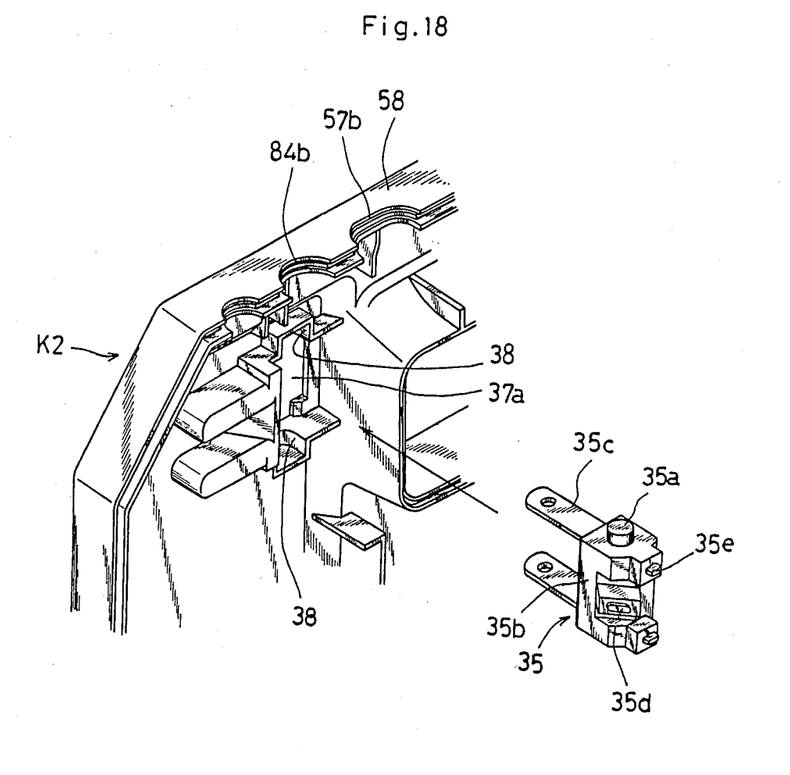
FIG. 18 is a fragmentary exploded perspective view of the second piece at the rear face thereof.

The electrical connector plug 35 is, as shown in FIG. 3 and FIG. 18, composed of a base section 35b of synthetic resin on both sides of which pivots 35a are projecting and two metal plug-blades 35c being inserted to the base section 35b. The plug 35 is attached to the face of second piece K2 capable of sticking out and sinking in, near a center of gravity O of the whole can opener, that is to say, close to the motor 5 and the reduction gear mechanism 14.

In greater detail, a recession 37 for mounting the plug 35 is formed on the partially rising face 36 corresponding to the thickness of the motor 5. On the recession 37, a window 37a for allowing the plug to pass therethrough and a bearing grooves 38 to bear the pivots 35a are formed. The bearing grooves 38 communicates with the inside of the second piece K2 as illustrated in FIG. 18. Therefore, the pivots 35a can be inserted to the bearing grooves 38 through the window 37a from inside the second piece K2. The plug 35 sinks in the recession 37 to be in the same level of the rising face 36 when not used. When the can opener is used, the plug-blades 35c are turned around the pivots 35a as in FIG. 4 so that the plug-blades 35c perpendicularly stands on the second piece K2 from the recession 37.

The other ends 35e of the plug-blades 35c penetrating the base section 35b function as metal contacts (not illustrated) for coming in electrical contact with fixed contact plates 39 as described in the following.

With reference to FIG. 1, fixed metal contact plates 39 are attached to the inside of the rear part K12 of the first piece K1 to come in contact with the above-mentioned ends 35e of the plug-blades 35c. And terminal stands 41 having bearing grooves 42 are integrally projected on the rear part K12. After attaching the plug 35 to the recession 37 the second piece K2 is fitted to the first piece K1, and the pivots 35a is surrounded by the bearing groove 42 and the bearing groove 38.

The terminal stands 41 and the aforementioned supporting board 34 are bridged by a T-shaped flat spring 43. The flat spring 43 consists of a trunk part 43a and bifurcated branch parts 43b spreading in a straight line to both sides. By being inserted between the terminal stands 41, the trunk section 43a is registered on ribs 44 integrally formed on side walls of the terminal stands 41, and the branch sections 43b are stopped by a projecting part or stopper 34a cut and stood up from the supporting board 34 and is registered on the supporting board 34.

With the T-shaped flat spring 43, a flat projection 35d (see FIG. 18) integrally formed on the base section 35b of the plug 35 is capable of coming in contact, thereby maintaining a standing state and a sinking state of the plug 35, respectively, by elastic deformation of the flat spring 43 following turning motion of the plug 35.

With the plug 35 standing on the rising face 36, the above-mentioned ends 35e of plug-blades 35c come in elastic contact with the contact plates 39, and an electrically contacting state is maintained. When the plug-blades 35c sinks within the rising face 36, the electrically contacting state is cleared.

The transformer T is disposed at a position near the motor 5 determined by ribs 45 in a housing space 12A of the handle section 12. The transformer T located at that position is so close to the plug 35 to shorten a high-voltage wiring.

In the above-mentioned secondary batteries, batteries B2 and B3 are disposed at a position in the rear of the transformer T (left-hand side in FIG. 1) determined by ribs 46 and a surrounding wall 47 of the first piece K1, and the last battery B1 is disposed at a position in the rear part of the upper housing space 12B of the handle section 12 determined by ribs 48 and the surrounding wall 47. The former two batteries B2, B3 are directly connected to each other and the last battery B1 is electrically connected to the battery B2 through a lead plate 49, thus the total three batteries are connected in series.

The operation control switch S comprises a fixed contact plate 54 attached to a printed circuit board 53 which is inserted between ribs 51 and ribs 52 of the first piece K1, a movable contact plate 55 capable of coming in contact with the fixed contact plate 54, and a first push button 56 to press down the movable contact plate 55.

The movable contact plate 55 includes a contact section 55a to come in contact with the fixed contact plate 54 by pushing down the first push button 56. The contact section 55a is folded downward so that the movable contact plate 55 is formed in a hill-shape as a whole.

The first push button 56 is disposed on top face of the casing K within a range so that the button 56 can be depressed by a thumb while gripping the handle section 12 through the rectangular opening 11.

With reference to FIGS. 4, 8 to 10 and FIG. 15, the first push button 56 comprises a cylindrical section 56a, a first operating section 56b and a second operating section 56c. The cylindrical section 56a is inserted in a through hole 57 composed of a half-round groove 57a formed on an upper surrounding wall of the first piece K1 and a half-round groove 57b formed an upper standing wall of the second piece K2. The first operating section 56b is integrally formed on the cylindrical section 56a at the lower part thereof facing the contact section 55b of the movable contact plate 55, and has a projection 65 to press the contact section 55a. The second operating section 56c is integrally formed on the cylindrical section 56a at the lower part thereof opposite to the first operating section 56b, having a slope 50 formed by obliquely cutting the upper side of the front end of the second operating section 56c.

On the lower end of the cylindrical section 56a, guide grooves 62 are formed at the first piece K1-side and the second piece K2-side, respectively (see FIG. 15, the first piece K1-side is not illustrated), so as to be guided by guide ribs 61 which will be described hereinafter. On inner faces of the first piece K1 and the second piece K2, guide ribs 61 are integrally formed (the second piece K2-side is not illustrated), respectively, extending in vertical direction. The first push button 56 goes up-and-down in the through hole 57 so that guide grooves 62 are guided by guide ribs 61.

With reference to FIG. 1, a cylindrical spring receiver 56d is formed inside the cylindrical section 56a. A saucer-shaped spring receiver 63 is integrally formed on the first piece K1 below the cylindrical section 56a. A coil spring 64 is provided between the receivers 56d and 63, usually biassing the first push button 56 upwards.

On the front side face (right-hand side in FIG. 8) of the cylindrical section 56a, there is formed a step 59 to be engaged with the through hole 57 at an edge 57c thereof with the first push button 56 being pushed down. By depressing the first push button 56 to engage the step 59 with the edge 57c, the movable contact plate 55 can keep a contact with the fixed contact plate 54.

The following means are provided to make sure of engagement of the step 59:

First, the guide ribs 61 are composed of an upper part 61a and the lower part 61b, where the lower part 61b is formed so as to be displaced in front of the upper part 61a. Accordingly, when the pressed button 56 is pushed down, the guide ribs 61 are guided by the guide grooves 62, and the push button 56 is displaced forward.

Since the contact section 55a is, as described hereinabove, folded downward to form the movable contact plate 55 in a hill-shape as a whole, the projection 65 which presses the contact section 55a is forwardly biassed by an elastic force of the movable contact plate 55.

Further, the top face of the cylindrical section 56a is formed with a step section 66b lower than a top section 66a. Between the step section 66b and the top section 66a, there is formed a slope 67. In this configuration, a forwardly directed force easily takes place by pushing the top face of the button 56 by a thumb.

Furthermore, a center line of the saucer-shaped spring receiver 63 is displaced to the front of the center line of the cylindrical spring receiver 56d as illustrated in FIG. 1. Thus, the lower part of the coil spring 64 is displaced to the front of the upper part thereof, and once depressed push button 56 moves to rear by an elastic restoring force of the coil spring 64 when the button is released.

In the above configuration, when the push button 56 is pressed down, the projection 65 comes in contact with the contact section 55a and lowers the contact section 55a. Then, the contact section 55a comes in contact with the fixed contact plate 54 and the operation control switch S turns on. At the same time, the step 59 of the cylindrical section 56a is engaged with the through hole 57 at the edge 57c, so that the push button 56 is locked in a state of being lowered down, and the contact between the contact section 55a and the contact plate 54 is maintained (see FIG. 10). This keeps the operation control switch S to be closed.

Diodes D1 to D3 and resistor R mentioned above are attached to the lower side of the printed circuit board 53 (not illustrated in FIG. 1). Light emitting diode LED stands on the printed circuit board 53 at the front part thereof above the third gear G3, and the top part of the light emitting diode LED is exposed to the outside from a window 68 formed on the upper face of the front part K11 of the first piece.

By the configuration of the electrical component mentioned above, the secondary batteries B1 to B3 can be recharged by projecting the plug 35 from the face of the casing K and inserting it in an electrical outlet with the casing. Cutting operation can be made at an arbitary place by removing the plug from an outlet.

In the can opener of the invention, the motor 5, reduction gear mechanism 14, transformer T and secondary batteries B1 to B3 are arranged surrounding the plug 35; the motor 5 and reduction gear mechanism 14 are arranged close to the plug 35. The transformer T and secondary batteries which are the heaviest next to the motor 5 and reduction gear mechanism 14 are in the opposite area of the housing, relative to the plug 35, from the motor 5 and reduction gear mechanism 14. By this configuration the space is effectively utilized as a whole, keeping a weight-balance in up-and-down and is front-and-rear directions. As shown in FIG. 3, the plug 35 is located near a center of gravity O of the can opener. As a result, the plug 35 is not applied with an excess rotating moment by a weight of the can opener, with the plug 35 being inserted in an electrical outlet, thereby the can opener does not easily come off from the outlet, preventing the can opener and the plug 35 from a fall-damage or the like.

Moreover, the casing K is of a flat shape, so that the can opener does not receive a large amount of moment even when an external force is carelessly applied to the can opener which is plugged in an electrical outlet.

Cutter Operating Mechanism

A configuration of the cutter operating mechanism B will be described hereinafter.

A rechargeable electric can opener has another weak-point in case that the cutter 105 in the prior art is utilized, that is to say, the cutter 105 stays in a state of biting into the lid 107 of the can when the battery has discharged electricity in a halfway of cutting operation. In raising the cutter 105 from the lid 107, the obliquely cut part 108 or 111 will receive a resistant force from the opened edge of the lid, thereby a large amount of force will be necessary to raise up the cutter 105. For this reason, a large-sized lever 104 is necessary as illustrated in FIG. 20, and a miniaturization of an electric can opener has been hardly realized.

The cutter operating mechanism B is attached to an upper section of the front part K11 of the casing K.

In the preferred embodiment, a cutter operating mechanism B is adopted, which is capable of raising up a cutter from the lid of the can by a small force without aid of a large handle-lever, when rotation of the feed wheel is stopped in can-opening operation.

A turning shaft 73 of the cutter 3 as illustrated in FIG. 6 is rotatably supported through a shaft-hole 72 formed on the front part K11 above the feed wheel 1. An end of the turning shaft 73 projects out of the casing K, on which the cutter 3 is fixed. On the other end of the turning shaft 73 projecting inside the casing K a metal turning plate 71 is fixed.

In greater detail, on the top part of the turning shaft 73 projecting out of the casing K has a square cross section of a dimension smaller than the diameter of the turning shaft 73 (hereinafter referred to as a fixing section 73a), and a screw hole 78 in which an undermentioned screw 79 is screwed is formed inside the fixing section 73a. Into the fixing section 73a, a lever 75 of synthetic resin having a square hole 76 is fitted to the fixing section 73a is pressed, and a cutter 3 which is formed with a square hole 77 which is fitted to the fixing section 73a is inserted to the fixing section 73a on top of the lever 75. Thereon, a screw 79 is screwed into the screw hole 78 and the cutter 3 is fixed to the turning shaft 73. The cutter 3 then turns around a center of rotation of the turning shaft 73 (hereinafter referred to as a pivot 74, see FIG. 11).

A shape of the fixing section 73a can not only be square but also oval or no-round. In the latter case, a shape of the hole 77 formed on the cutter 3 must be the same as to the oval or no-round shape.

The lever 75 mentioned above is integrally formed with a lift-up arm 75a on the top of the lever 75, as illustrated in FIG. 2. The cutter 3 can be raised up by putting a finger on the lift-up arm 75a and turning the lever 75 upwards as shown by one-dot chain line in FIG. 2. A tip of the lift-up arm 75a is adapted to come in contact with a top face of an arm stopper 90 as described later, so as to stop the downward turning movement of the cutter 3 to a specific angle. In addition, the lever 75 functions as a spacer to keep the cutter 3 from a face of the casing K in a predetermined interval, and further functions to prevent the turning shaft 73 which is penetrating the shaft-hole 72 from sliding through the shaft-hole 72, together with the turning plate 71 as a result of inserting tightly in the fixing section 73a.

Figure 11:
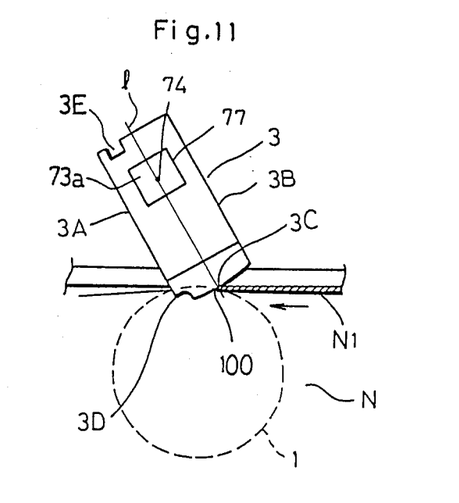
FIG. 11 is an explanatory view of can-opening operation.

The cutter 3 mentioned above has almost a rectangular shape as shown in FIG. 11, wherein an arc-shaped cutting edge 3C around the pivot 74 is formed between a lower end of a front side (left-hand side in FIG. 11) edge 3A and a lower end of a rear side (right-hand side in FIG. 11) edge 3B of the cutter 3, and an acute top part 3D is formed by notching a front corner section of the cutting 3C so as to bite into the lid of the can.

The cutter 3 is almost symmetrical in right-and-left directions and there is a fear of being reversely attached by mistake. Therefore, it is preferable for instance, to form a notch 3E displaced from a center line 1 to right or left and also to form a projection (not illustrated) to fit with the notch 3E on the cutter-attaching side of the lever 75, so as to prevent a miss-attachment by reversing the cutter 3 as illustrated in FIG. 11. The notch 3E can be replaced by a projection, in which case the lever 75 must be formed with a notch.

Figure 17:
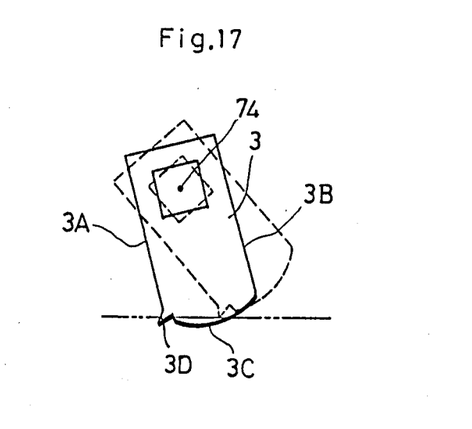
FIG. 17 is a view depicting another embodiment of a cutter-shape.

The biting top part 3D may be in a projecting tooth-shape as shown in FIG. 17.

The turning plate 71 mentioned above is, as shown in FIGS. 8 to 10, biassed in a direction of the arrow P in FIG. 8 i.e. a direction of lowering the cutting edge 3C by a biasing means e.g. a coil spring 82 one end of which is engaged within the casing K and the other end of which is engaged to a projection 71d formed on the turning plate 71.

Figure 8:
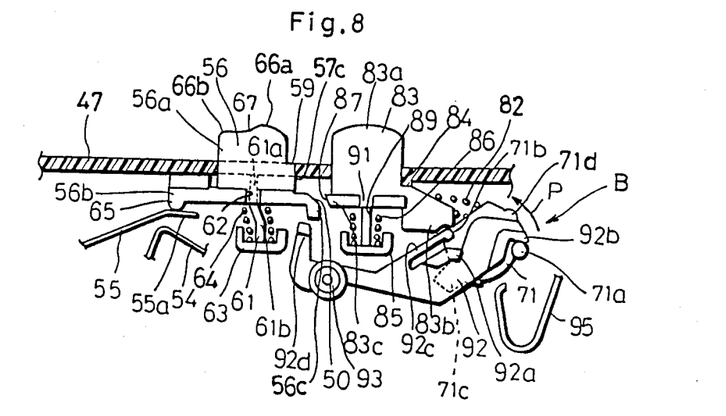
FIGS. 8 to 10 are explanatory views of different operation modes of a first push button and a second push button.
Figure 16:
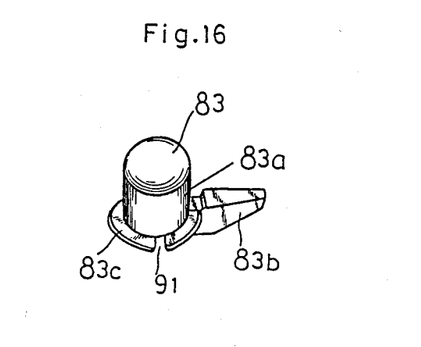

With reference to FIGS. 8 and 16, on the top face of the casing K at the front side of the first push button 56, a second push button 83 of synthetic resin to raise the cutting edge is disposed within a range so that the button 83 can be depressed by a thumb while gripping the handle section 12 through the rectangular opening 11.

The second push button 83 comprises a cylindrical section 83a, a first operating section 83b for raising a cutter, and a second operating section 83c for stopping the operation. The cylindrical section 83a is to be inserted in a through hole 84 composed of a half-round groove 84a formed on a surrounding wall 47 as a top face of the first piece K1 and a half-round groove 84b formed on a surrounding wall 58 as a top face of the second piece K2. The first operating section 83b and the second operating section 83c are integrally formed on the cylindrical section 83a at the lower part thereof.

A height of the cylindrical section 83a from the top face of the casing K is made higher than the height of the cylindrical section 56a of the first push button 56 from the same top face.

The second push button 83 is usually biassed upwards by a spring 86 provided between the spring receiver 85 formed on the casing K and a cylindrical spring receiver 83d formed inside the cylindrical section 83a.

Where the aforementioned step 59 of the first push button 56 is engaged with the edge 57c of the through hole 57, the second operating section 83c is positioned above the slope 50 formed on the upper side of the front end of the second operating section 56c.

On the lower side of the rear edge of the second operating section 83c, a slope 87 is formed. When the second push button 83 is pressed down, the slope 87 comes in contact with the slope 50 so as to lower the slope 50, and the first push button 56 is displaced to the rear and the step 59 is disengaged with the edge 57c. In the invention, both slopes 50 and 87 are not required as in this specific embodiment, but only one slope may be provided on any one of the operating sections.

The numeral 89 denotes a couple of guide ribs formed on the first piece K1 and the second piece K2, respectively (A rib on the second piece is not illustrated). On the cylindrical section 83a, a couple of grooves 91 is formed to fit to the guide ribs 89 (see FIG. 16, a groove on the first piece is not illustrated). The cylindrical section 83a moves up and down so that the grooves 91 are guided through the guide ribs 91.

In the casing K, an operation lever 92 of synthetic resin is turnably attached to a support shaft 93 projectingly disposed on the inner face of the casing K. The operation lever 92 is to turn the turning plate 71 toward the cutting-edge raising direction or the opposite direction to the arrow P against the elastic force of the coil spring 82.

Figure 9:
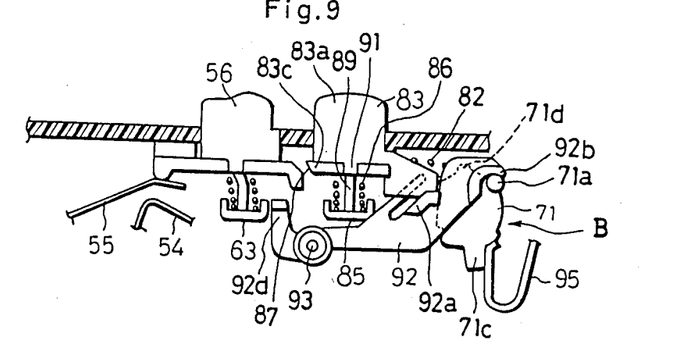
Figure 10:
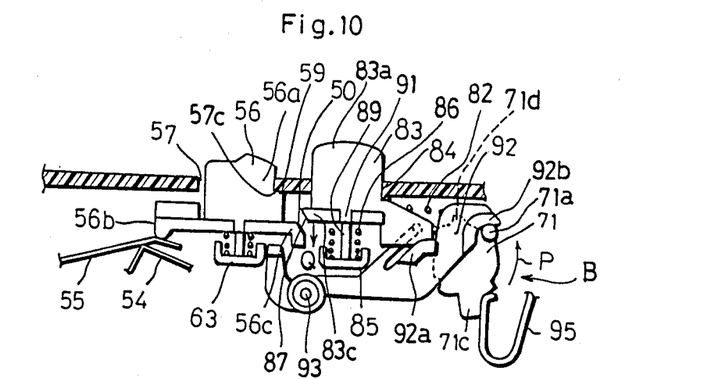

In greater detail, the operation lever 92 includes a first engaging section 92a at the middle part thereof projectingly provided to come in contact with the first operating section 83b when the second push button 83 is pressed down, and a second engaging section 92b at the top part thereof to come in contact with a pin 71a projectingly provided on the turning plate 71 when the operation lever 92 is turned (see FIGS. 9 and 10).

The numeral 95 denotes a U-shaped leaf spring attached to the casing K. When the cutter 3 is in a lowered state, the leaf spring 95 comes in contact with the projection 71c of the turning plate 71 to slightly bias the turning plate 71 in a cutting edge-raising direction from the state that the above lift-up arm 75a is in contact with the top face of the arm stopper 90. Thereby, the leaf spring 95 urges the turning plate 71 in a direction of the arrow P to apply a force to the cutter 3 in a cutter-raising direction, where the cutter 3 remains in the lid of the can caused by a discharge of battery or the like, so that it becomes easy to raise up the cutter 3 from the lid of the can.

Figure 4:
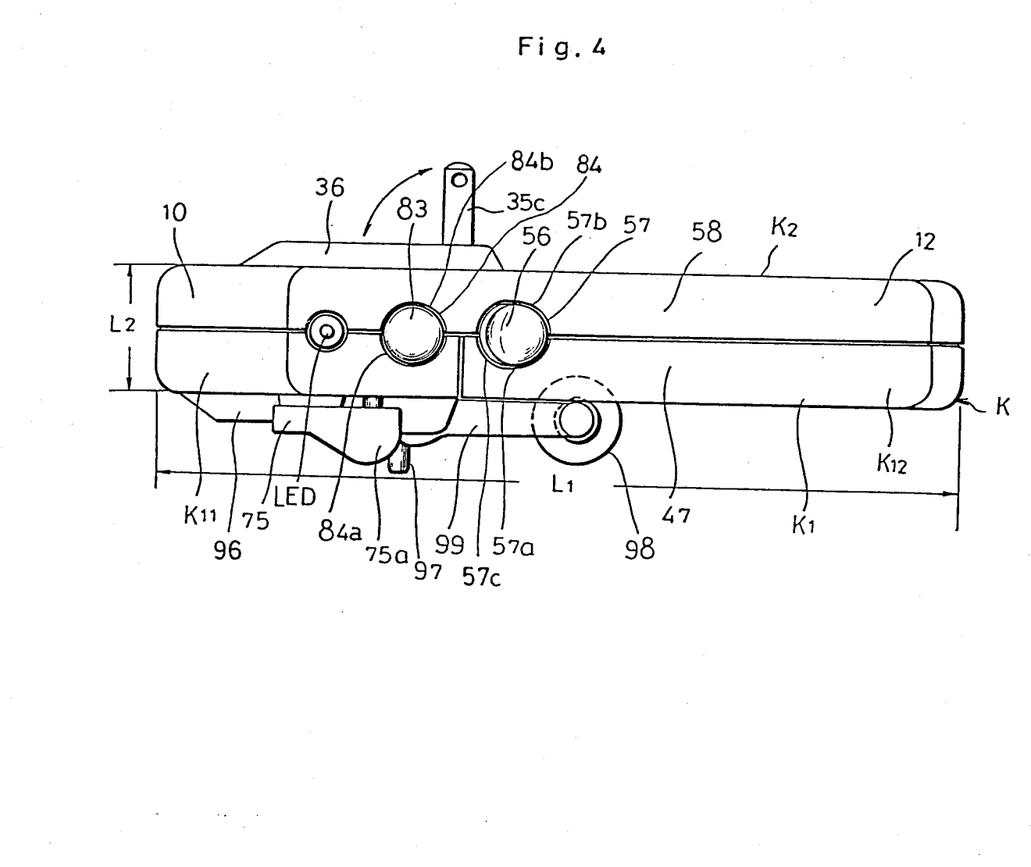
FIG. 4 is a top view.
Figure 5:
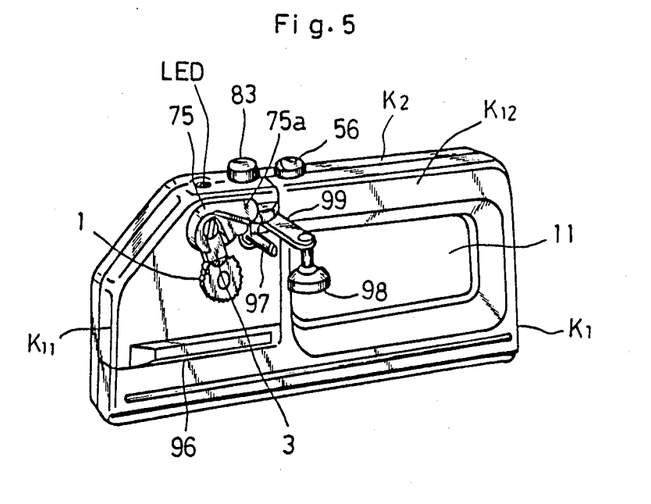
FIG. 5 is a perspective view.

On the outer face of the first piece K1 of the casing K, a can-supporting ridge 96 is projectingly provided as shown in FIGS. 2, 4 and 5 so as to separate the can N from the casing K in a predetermined interval. The numeral 97 is a can-holding shaft, and the numeral 98 is a magnet attached to an arm 99 turnable in a horizontal direction. The magnet 98 atracts the lid of the can.

Figure 12:
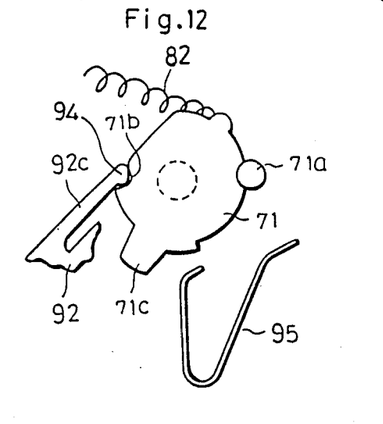
FIGS. 12 and 13 are explanatory views of different operation modes of a turning plate and an operation lever.
Figure 13:
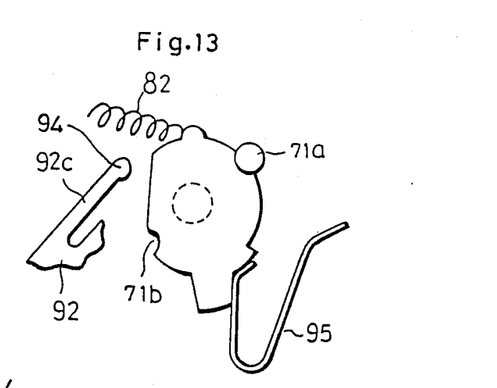
Figure 14:
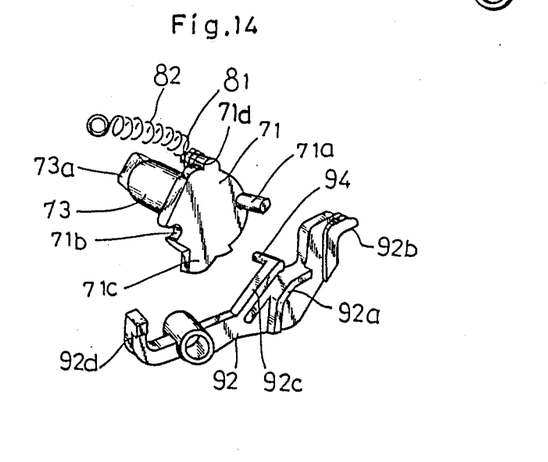
FIG. 14 is an exploded perspective view.
Figure 15:
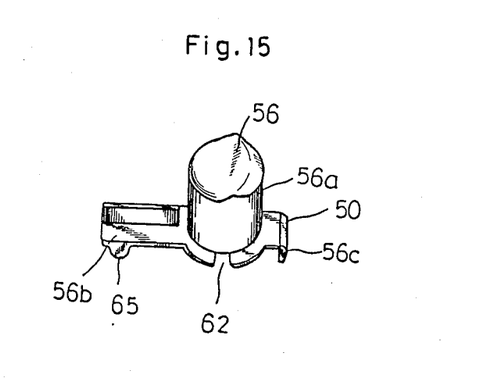
FIGS. 15 and 16 are perspective views of a first push button and a second push button.

In another embodiment of the turning plate 71 and the operation lever 92 of the invention, an engaging groove 71b is formed on the turning plate 71, and an elasticaly deformable operation arm 92c is integrally formed on top of the middle part of the operation lever 92 as shown in FIGS. 12 to 14. The operation arm 92c mentioned above includes a projecting pin-shaped engaging section 94 on the top end thereof to engage with the engaging groove 71b when the second push button 83 is pressed down. In the above configuration, on the operation lever 92, there must be formed a releasing arm 92d at the opposite side to the operation arm 92c, capable of being lowered down by the second operating section 56c when the first push button 56 is pressed down.

A can-opening operation of the invention in the foregoing configuration will be described below in detail.

When the can opener is not used, the cutter 3 is in a position where the cutting edge is lowered as shown in a solid line of FIG. 2. When a can-opening operation is performed, the second push button 83 is first pressed down halfway by a thumb of a right hand against the spring 86, putting the first operating section 83b in contact with first engaging section 92a of the operation lever and turning the operation lever 92 in the opposite direction to the arrow P around the support shaft 93. Then, the second engaging section 92b of the operation lever 92 presses down the pin 71a projectingly provided on the turning plate 71 against the spring 82 to raise the lever 75 and the cutter 3 up to a position in one-dot chain line in FIG. 2.

In case that the operation lever 92 includes an operation arm 92c and a releasing arm 92d, the pin-shaped engaging section 94 is engaged with the engaging groove 71b formed on the turning plate 71 by pressing down the second push button 83 still more deeply, so as to lock the turning plate 71 in an unturnable state. When the finger is separated from the second push button 83, the second push button 83 returns to the original position by an elastic force of the coil spring 86, though the cutter 3 is kept in an edge-raised state.

Next, a can N is held by a left hand and the edge thereof is put on the feed wheel 1, and the side face of the can N is brought in contact with the can-supporting ridge 96.

Thereafter, the push button 56 for operation is pressed down by a thumb, and the second operating section 56c pushes down the releasing arm 92d, thereby the pin-shaped engaging section 94 turns upward around the support shaft, and the engagement with the engaging groove 71b is released. The turning plate 71 turns in a direction of the arrow P in FIG. 8 by an elastic force of the spring 82, so that the lever 75 and the cutter 3 turn to a position depicted by the solid line in FIG. 2 to hold the lid N1 of the can.

At the same time, the projection 65 comes in contact with the contact section 55a to push it down, thereby the contact section 55a comes in contact with the fixed contact plate 54 to turn on the operation control switch S. Such contact-state is maintained by the step 59 formed on the push button 56 being engaged with the edge 57c of the through hole 57.

The feed wheel 1 then starts rotating to carry the edge of the can N and the cutter 3 automatically bites into the lid N1 from the top part 3D thereof to open the lid N1.

After the lid N1 is opened, the second push button 83 is pressed down halfway. Then the second operating section 83c of the second push button 83 presses down the second operating section 56c of the first push button 56, so that the step 59 is disengaged with the edge 57c, then the first push button 56 automatically returns upward, the operation control switch S is turned off, and the motor 5 stops. In that moment, the can N is sandwitched between the cutter 3 and the feed wheel 1 and does not fall off even if the can N is not held by a hand. Under the condition mentioned above, the can N is held by a left hand, and the second push button 83 is further pressed down. Then the operation lever 92 is turned in the opposite direction to the arrow P of FIG. 8, and the above-mentioned pin-shaped engaging section 94 is engaged with the engaging groove 71b formed on the turning plate 71, to turn the turning plate 71 to a locked state wherein the turning plate 71 cannot be turned. In such a condition, the cutter 3 is kept in a raised position, and the can N can be removed.

Where the cutter-operating mechanism of the invention does not include an operation arm 92c or a releasing arm 92d on the operation lever 92, the second push button 83 is then pressed down to the bottom and the cutter 3 becomes in a raised position as in a one-dot chain line of FIG. 2. The edge of the can N is put on the feed wheel 1 with the second push button 83 being pressed down, and the side face of the can N is brought into contact with the can-supporting ridge 96. In the above arrangement, the press of the first push button 83 is released, then the cutter 3 is lowered so that the top part 3D comes in contact with the lid N1. At the same time, the push button 83 is returned to the original position due to an elastic force of the coil spring 86. Next, the push button 56 for operation is pressed down, the motor 5 is actuated, and the lid N1 can be opened as the same manner in the aforementioned case. After the lid N1 is opened, the second push button 83 is pressed down halfway, then the second operating section 83c of the second push button 83 presses down the second operating section 56c of the first push button 56, the engagement of the step 59 with the edge 57c is released, the first push button 56 automatically returns upward, the operation control switch S is turned off, and the motor 5 is deenergized. By pressing down the second push button 83 to the bottom, the operation lever 92 is turned in an edge-raising direction, and the can N can be removed.

In the can opener of the invention, a height of the second push button 83 from the top face of the casing K is made higher than a height of the first push button 56 from the top face of the casing K, as described hereinabove. Therefore, in every operations, the both push buttons 56 and 83 can be easily pressed by a thumb of a hand gripping the handle section 12 through the opening 11, respectively. This reduces a possibility of a dangerous actuation of the motor by carelessly pressing the first push button 56 during the second push button 83 is operated.

During the can-opening operations mentioned above, the secondary battery may be discharged-up, for instance, and the can-opening operation stops, at that moment the cutter 3 remains in a state that the cutting edge 3D is biting into the lid N1 of the can, as shown in FIG. 11. In the invention, obliquely cut cutting edge 108, 109 or 111 (FIG. 20) in the prior art is replaced by the cutting edge 3C of the cutter 3 formed in an arc-shape around the pivot 74, so that the cutting edge 3C does not suffer from a large resistant force from the opened edge 100 of the lid N1 when the cutter 3 is raised by depressing the push button 83. When it is difficult to raise up the cutter 3 through the push button 83, the cutter 3 can be raised up directly by pushing up the lever with a finger.

Further, a turning center of the cutter 3 is positioned in the cutter 3 itself, so that a distance between an operation or cutting point and the pivot 74 can be shortened, thereby reducing a force for raising up the cutting edge from the lid N1 through the push button 83 or the lever 75; thus, a large handle-lever 104 (FIG. 19) in the prior art is unnecessary.

Moreover, the acute top part 3D of a notch or projection to bite the lid N1 is formed at the corner of the cutting edge, so that biting into the lid N1 can be more smoothly performed by rotating the feed wheel 1 with the cutter in contact with the lid of the can.

In the embodiments explained above, the attaching direction of the motor 5 is not limited to that illustrated in figures, and locations of the transformer T and batteries B1 to B3 can be exchanged from one another. The shape of the casing may be not only a handy-type but also a desk-type.

While the present invention has been described hereinabove in detail with respect to one or two specific embodiment of the rechargeable electric can opener referring to the accompanying drawings, it should be understood that the present invention is not limited to this specific embodiment alone, and various changes and modifications can be done without departing the scope and spirit of the invention.

What we claim is:

1. A rechargeable electric can opener including a casing of reduced thickness containing a motor and a reduction gear mechanism which is connected to a shaft of the motor, a feed wheel for carrying a can, said feed wheel being located on a first side face of the casing, said reduction gear mechanism having an output end which is connected to the feed wheel, and a cutter means for opening a lid of the can and for supporting an edge of a can in collaboration with the feed wheel; said can opener comprising an electrical connector plug attached to a second side face of the casing close to a center of gravity of the can opener capable of projecting out from and retracting into said second face, a step-down transformer having a primary side and a secondary side, said primary side being electrically connected to the plug, and a battery connected to the secondary side of the step-down transformer for feeding power to the motor.

2. A rechargeable electric can opener according to claim 1, wherein said step-down transformer and battery are located at an opposite area of the casing relative to the plug, from the motor and reduction gear mechanism.

3. A rechargeable electric can opener according to claim 1, wherein said cutter means is mounted on a turning shaft which is rotatably provided on said outer face of the casing, and is formed with an arc-shaped cutting edge along a predetermined side of the cutter means; said cutting edge having a center-of-arc on said turning shaft.

4. A rechargeable electric can opener according to claim 3, wherein said cutter means is directly fixed to the turning shaft.

5. A rechargeable electric can opener according to claim 3 wherein said cutting edge has an acute top part at a corner thereof, which bites into the lid of the can.

6. A rechargeable electric can opener according to claim 5, wherein said acute top part is a notch formed on the cutting edge.

7. A rechargeable electric can opener according to claim 5, wherein said acute top part is a projection formed on the cutting edge.

8. A rechargeable electric can opener according to claim 1, wherein said casing is divided into a first piece mounting the motor, reduction gear mechanism, feed wheel, cutter and secondary battery, and a second piece to be fitted to the first piece; said second piece being provided with the plug thereon.

9. A rechargeable electric can opener according to claim 8, wherein said first piece is divided into a front part mounting the motor, reduction gear mechanism, feed wheel and cutter means, and a rear part mounting the step-down transformer and battery.

10. A rechargeable electric can opener according to claim 1, which further comprises a turning plate which is disposed in the casing and is operatively connected to the cutter means to move the cutter means vertically, a biasing means disposed in the casing usually biasing the turning plate in a direction of lowering the cutting edge, said casing having a top face provided with a second push button which is movable to turn the turning plate in a direction of raising the cutting edge in opposition to the biasing means, and a first push button on the same top face to control an electrical actuation of the motor.

11. A rechargeable electric can opener according to claim 10, wherein said first push button is positioned close to and at the rear of the second push button, said first push button having a lower projecting height from the top face of the casing than the second push button.

12. A rechargeable electric can opener according to claim 10, wherein the casing has a handle section, and said first push button and second push button are positioned within reach of a thumb of a hand gripping the handle section of the casing.

* * * * *